(12) United States Patent
Tong et al.

(10) Patent No.: US 10,244,307 B1
(45) Date of Patent: Mar. 26, 2019

(54) COMMUNICATION OF WIRELESS HEADPHONES

(71) Applicant: Bestechnic (Shanghai) Co., Ltd., Shanghai (CN)

(72) Inventors: Weifeng Tong, Shanghai (CN); Liang Zhang, Shanghai (CN); Dongsheng Cui, Shanghai (CN); Lei Yang, Shanghai (CN)

(73) Assignee: Bestechnic (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 15/952,444

(22) Filed: Apr. 13, 2018

(30) Foreign Application Priority Data

Feb. 9, 2018 (CN) .......................... 2018 1 0131196

(51) Int. Cl.
| | |
|---|---|
| *H04B 5/00* | (2006.01) |
| *H04R 1/10* | (2006.01) |
| *H04L 1/16* | (2006.01) |
| *H04W 72/04* | (2009.01) |
| *H04W 76/10* | (2018.01) |
| *H04W 4/80* | (2018.01) |

(52) U.S. Cl.
CPC ............ *H04R 1/1091* (2013.01); *H04L 1/16* (2013.01); *H04W 72/0446* (2013.01); *H04W 76/10* (2018.02); *H04R 2420/07* (2013.01); *H04W 4/80* (2018.02)

(58) Field of Classification Search
CPC .............................. H04R 1/1091; H04W 76/10
USPC ............ 381/74, 79, 311, 384; 348/554, 558; 455/41.2, 570, 575.2
See application file for complete search history.

(56) References Cited

U.S. PATENT DOCUMENTS

| | | | | |
|---|---|---|---|---|
| 8,320,877 | B2 * | 11/2012 | Hansen ............... | H04W 72/048 340/426.19 |
| 2010/0303185 | A1 * | 12/2010 | Haartsen ........... | H04W 52/0216 375/362 |

(Continued)

FOREIGN PATENT DOCUMENTS

CN 105284134 A 1/2016

*Primary Examiner* — William J Deane, Jr.
(74) *Attorney, Agent, or Firm* — Bayes PLLC

(57) ABSTRACT

Embodiments of wireless audio systems and methods for wirelessly communicating audio information are disclosed herein. In one example, a wireless audio system includes a primary wireless headphone and a secondary wireless headphone. The primary wireless headphone is configured to receive, from an audio source, audio information using a short-range wireless communication protocol; transmit, to the audio source, a first message indicative of whether the audio information is successfully received; and transmit a communication parameter associated with the short-range wireless communication protocol used between the audio source and the primary wireless headphone. The secondary wireless headphone is configured to receive, from the primary wireless headphone, the communication parameter; receive, from the audio source, the audio information based on the communication parameter using the short-range wireless communication protocol; and transmit, to the audio source, a second message when the audio information is successfully received. The first message and second message determine whether to re-transmit the audio information.

17 Claims, 10 Drawing Sheets

(56) References Cited

U.S. PATENT DOCUMENTS

| | | | |
|---|---|---|---|
| 2012/0058727 A1 | 3/2012 | Cook et al. | |
| 2012/0155670 A1* | 6/2012 | Rutschman | H04M 1/6066 |
| | | | 381/74 |
| 2015/0382095 A1* | 12/2015 | Shin | H04R 1/1033 |
| | | | 242/385.4 |
| 2016/0323881 A1* | 11/2016 | Bhora | H04L 1/1854 |
| 2017/0195768 A1* | 7/2017 | Kim | H04B 1/034 |
| 2017/0366924 A1* | 12/2017 | Thoen | H04L 1/245 |
| 2018/0035246 A1* | 2/2018 | Orescanin | H04R 1/1091 |
| 2018/0084456 A1* | 3/2018 | Gostev | H04R 1/1016 |
| 2018/0084606 A1* | 3/2018 | Li | H04W 88/04 |

* cited by examiner

COMMUNICATION OF WIRELESS HEADPHONES

CROSS-REFERENCE TO RELATED APPLICATIONS

This application claims the benefit of priority to Chinese Patent Application No. 201810131196.6 filed on Feb. 9, 2018, which is incorporated herein by reference in its entirety.

BACKGROUND

Embodiments of the present disclosure relate to wireless audio systems.

Loudspeakers, including headphones, have been widely used in daily life. Headphones are a pair of small loudspeaker drivers worn on or around the head over a user's ears, which convert an electrical signal to a corresponding sound.

Wired headphones, however, constrain the users' movement because of the wires (cords), and are particularly inconvenient during exercise. Conventional wireless headphones no longer need the wires between the headphones and the audio sources, but still require the wires between the left and right headphones.

SUMMARY

Embodiments of wireless audio systems and methods for wirelessly communicating audio information are disclosed herein.

In one example, a wireless audio system includes a primary wireless headphone and a secondary wireless headphone. The primary wireless headphone is configured to receive, from an audio source, audio information using a short-range wireless communication protocol; transmit, to the audio source, a first message indicative of whether the audio information is successfully received by the primary wireless headphone; and transmit a communication parameter associated with the short-range wireless communication protocol used between the audio source and the primary wireless headphone. The secondary wireless headphone is configured to receive, from the primary wireless headphone, the communication parameter; receive, from the audio source, the audio information based on the communication parameter using the short-range wireless communication protocol; and transmit, to the audio source, a second message when the audio information is successfully received by the secondary wireless headphone. The first message and second message determine whether to re-transmit the audio information.

In another example, a wireless audio system includes a primary wireless headphone and a secondary wireless headphone. The primary wireless headphone is configured to receive, from an audio source, audio information using a short-range wireless communication protocol; transmit, to the audio source, a first message indicative of whether the audio information is successfully received by the primary wireless headphone; and transmit a communication parameter associated with the short-range wireless communication protocol used between the audio source and the primary wireless headphone. The secondary wireless headphone is configured to receive, from the primary wireless headphone, the communication parameter; receive, from the audio source, the audio information based on the communication parameter using the short-range wireless communication protocol; and transmit, to the audio source, a second message when the audio information is not successfully received by the secondary wireless headphone. The first message and second message determine whether to re-transmit the audio information.

In still another example, a wireless audio system includes a primary wireless headphone and a secondary wireless headphone. The primary wireless headphone is configured to receive, from an audio source, audio information using a first short-range wireless communication protocol at a first frequency; and transmit a communication parameter using a second short-range wireless communication protocol amended from the first short-range wireless communication protocol at a second frequency lower than the first frequency. The communication parameter is associated with the first short-range wireless communication protocol used between the audio source and the primary wireless headphone. The secondary wireless headphone is configured to receive, from the primary wireless headphone, the communication parameter; receive, from the audio source, the audio information based on the communication parameter using the first short-range wireless communication protocol at the first frequency; and transmit, to the primary wireless headphone, a first message when the audio information is successfully received by the secondary wireless headphone or when the audio information is not successfully received by the secondary wireless headphone using the second short-range wireless communication protocol at the second frequency. The primary wireless headphone is further configured to transmit, to the audio source, a second message indicative of whether both the primary wireless headphone and the secondary wireless headphone successfully receive the audio information based on the first message using the first short-range wireless communication protocol at the first frequency.

In a different example, a method for wirelessly communicating audio information is disclosed. Audio information is received by a primary wireless headphone from an audio source using a short-range wireless communication protocol. A first message is transmitted by the primary wireless headphone to the audio source indicative of whether the audio information is successfully received by the primary wireless headphone. A communication parameter associated with the short-range wireless communication protocol used between the audio source and the primary wireless headphone is transmitted by the primary wireless headphone. The communication parameter is received by a secondary wireless headphone from the primary wireless headphone. The audio information is received by the secondary wireless headphone from the audio source based on the communication parameter using the short-range wireless communication protocol. A second message is transmitted by the secondary wireless headphone to the audio source when the audio information is successfully received by the secondary wireless headphone or a third message is transmitted by the secondary wireless headphone to the audio source when the audio information is not successfully received by the secondary wireless headphone. The first message and second message or the first message and third message determine whether to re-transmit the audio information.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE DRAWINGS

The accompanying drawings, which are incorporated herein and form part of the specification, illustrate the presented disclosure and, together with the description, further serve to explain the principles of the disclosure and enable a person of skill in the relevant art(s) to make and use the disclosure.

FIGS. 1A and 2B are block diagrams illustrating an exemplary wireless audio system in accordance with various embodiment.

Figure 1A:
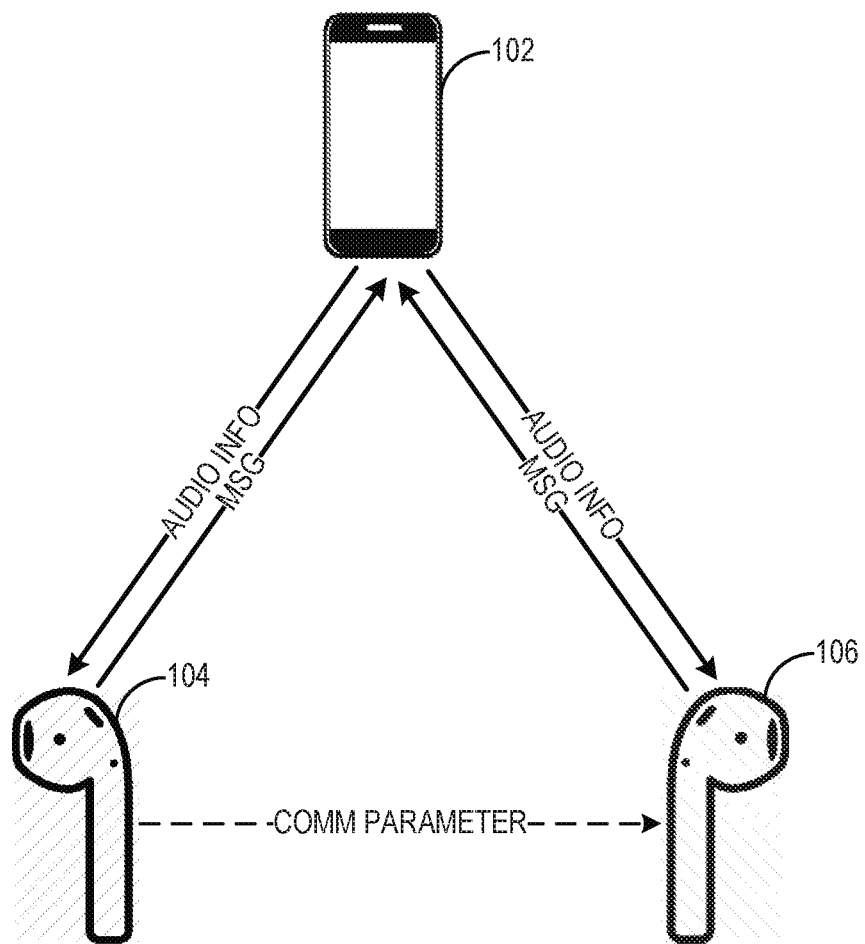

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Although specific configurations and arrangements are discussed, it should be understood that this is done for illustrative purposes only. It is contemplated that other configurations and arrangements can be used without departing from the spirit and scope of the present disclosure. It is further contemplated that the present disclosure can also be employed in a variety of other applications.

It is noted that references in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it is contemplated that such feature, structure or characteristic may also be used in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

True wireless stereo (TWS) headphones (also known as untethered headphones) is a type of wireless headphones that remove the wires between the left and right headphones. In some TWS headphones, a primary wireless headphone can simultaneously communicate with an audio source and a secondary wireless headphone. For example, the audio source transmits data (music, audio, or data packets) to the primary wireless headphone using Bluetooth, and the primary wireless headphone then forwards the data to the secondary wireless headphone. This approach can cause the high power consumption of the primary wireless headphone. Also, the physical structures of the human head between the left and right ears can affect the data transmission quality between the primary and secondary wireless headphones, such as causing lagging and/or high latency.

As will be disclosed in detail below, among other novel features, the wireless audio systems disclosed herein can achieve "true wireless stereo" with improved data transmission quality and reduced headphone power consumption. In some embodiments of the present disclosure, the primary wireless headphone establishes a normal bidirectional communication link with the audio source to receive the audio data (e.g., stereo audio), while the secondary wireless headphone establishes a snoop bidirectional communication link with the audio source to snoop communications on the normal bidirectional communication link and receive the audio data from the audio source as well. Having the secondary wireless headphone work in the snoop mode can reduce the power consumption of the primary wireless headphone because the primary wireless headphone no longer needs to forward the audio data to the secondary wireless headphone. Moreover, both the primary and secondary wireless headphones can participate in acknowledging the reception of the audio data (e.g., using acknowledgment (ACK) and negative acknowledgement (NACK or NAK) packets). As a result, if at least one of the primary and secondary wireless headphones cannot successfully receive the audio data packet from the audio source in any time slot, then in the subsequent time slot, the audio source receives an NACK packet or otherwise cannot receive a complete ACK packet. Accordingly, as long as there is at least one of the primary and secondary wireless headphones cannot successfully receive the audio data packet from the audio source, the audio source will re-transmit the audio data packet, thereby ensuring the data transmission reliability.

In some embodiments of the present disclosure, the secondary wireless headphone can transmit a message to the primary wireless communication indicative of whether the audio information from the audio source is successfully received by the secondary wireless headphone. The message can be transmitted to the primary wireless communication at a frequency lower than the frequency used by the communications with the audio source, for example, using near-field magnetic induction (NFMI) communication, which is known to be able to effectively pass through the physical structures of the human head, reduce signal interference, maintain high bit rate transmission, ensure audio play quality, and reduce power consumption. According to the message received from the secondary wireless headphone, the primary wireless headphone can determine a message indicative of whether both the primary and secondary wireless headphones successfully receive the audio information from the audio source and transmit the message to the audio source, for example, using Bluetooth or WiFi communication. At least one of the primary and secondary wireless headphones can transmit another audio information (e.g., voice information) to the audio source during, for example, voice calls. For example, the secondary wireless headphone may transmit the voice information to the audio source while at the same time (or substantially the same time) transmitting the message to the primary wireless headphone.

Additional novel features will be set forth in part in the description which follows, and in part will become apparent to those skilled in the art upon examination of the following and the accompanying drawings or may be learned by production or operation of the examples. The novel features of the present disclosure may be realized and attained by practice or use of various aspects of the methodologies, instrumentalities, and combinations set forth in the detailed examples discussed below.

FIG. 1A is a block diagram illustrating an exemplary wireless audio system 100 in accordance with an embodiment. Wireless audio system 100 may include an audio source 102, a primary wireless headphone 104, and a secondary wireless headphone 106. Audio source 102 may be any suitable device that can provide audio information including, for example, music or voice in the digital or analog format. Audio source 102 may include, but is not limited to, a handheld device (e.g., dumb or smart phone, tablet, etc.), a wearable device (e.g., eyeglasses, wrist watch, etc.), a radio, a music player, an electronic musical instrument, an automobile control station, a gaming console, a television set, a laptop computer, a desktop computer, a netbook computer, a media center, a set-top box, a global positioning system (GPS), or any other suitable device. Primary wireless headphone 104 and secondary wireless headphone 106 may be a pair of loudspeakers that can be worn on or around the head over a user's ears. Primary wireless headphone 104 and secondary wireless headphone 106 may be any electroacoustic transducers that convert an electrical signal (e.g., representing the audio information provided by audio source 102) to a corresponding sound. In some embodiments, each primary wireless headphone 104 and secondary wireless headphone 106 may be an earbud (also known as earpiece) that can plug into the user's ear canal. In some embodiments, primary wireless headphone 104 and secondary wireless headphone 106 may be TWS headphones, which are individual units that are not physically held by a band over the head and/or electrically connected by a cord. Primary wireless headphone 104 and/or secondary wireless headphone 106 may be combined with a microphone to form a headset according to some embodiments. It is understood that although in FIG. 1, wireless audio system 100 includes both audio source 102 and the pair of primary and secondary wireless headphones 104 and 106, in some embodiments, wireless audio system 100 may include only primary wireless headphone 104 and secondary wireless headphone 106.

As shown in FIG. 1, bidirectional communications may be established between audio source 102 and primary wireless headphone 104 and between audio source 102 and secondary wireless headphone 106. In some embodiments, a normal bidirectional communication link may be established between audio source 102 and primary wireless headphone 104 using a short-range wireless communication protocol (e.g., the Bluetooth or WiFi protocol). That is, primary wireless headphone 104 may work in the normal mode. In the normal mode, primary wireless headphone 104 may receive audio information (e.g., in data packets) transmitted by a carrier wave from audio source 102 via the normal bidirectional communication link. In some embodiments, audio information may be a stream of audio stereo information in the form of compressed or uncompressed stereo samples for first and second audio channels, such as left-channel audio information and right-channel audio information or the like. Primary wireless headphone 104 may transmit messages back to audio source 102 in response to the reception of the audio information from audio source 102. As described below in detail, the messages transmitted by primary wireless headphone 104 may include, for example, acknowledgement (ACK) packets, negative acknowledgement (NACK) packets, and partial-acknowledgement (ACK_P) packets.

In some embodiments, a snoop bidirectional communication link may be established between audio source 102 and secondary wireless headphone 106 using the same short-range wireless communication protocol (e.g., the Bluetooth or WiFi protocol). That is, secondary wireless headphone 106 may work in the snoop mode in which the connection with secondary wireless headphone 106 may not be known by audio source 102. In the snoop mode, secondary wireless headphone 106 may snoop (also known as listen or otherwise eavesdrop) the communications between audio source 102 and primary wireless headphone 104 on the normal bidirectional communication link. By snooping the communications between audio source 102 and primary wireless headphone 104, secondary wireless headphone 106 may also receive the audio information (e.g., in data packets) transmitted by the carrier wave from audio source 102 via the snoop bidirectional communication link. Secondary wireless headphone 106 may transmit messages back to audio source 102 in response to the reception of the audio information from audio source 102. As described below in detail, the messages transmitted by secondary wireless headphone 106 may include, for example, interfering packets and partial-acknowledgement (ACK_P) packets.

Since secondary wireless headphone 106 works in the snoop mode, audio source 102 may not be aware that secondary wireless headphone 106 is receiving the audio information transmitted by audio source 102 as well. As a result, secondary wireless headphone 106 may need to actively participate in the acknowledgement of the reception of the audio information in case any audio information (e.g., an audio data packet) is not successfully received by secondary wireless headphone 106. In some embodiments, if at least one of primary wireless headphone 104 and secondary wireless headphone 106 does not successfully receive the audio information transmitted by audio source 102, audio source 102 will not receive a complete message (e.g., an ACK packet) indicative of the successful transmission of the audio information and thus, will re-transmit the audio information until the necessary complete message is received. That is, only when primary wireless headphone 104 and secondary wireless headphone 106 both successfully receive the audio information transmitted by audio source 102, audio source 102 will receive the complete message (e.g., an ACK packet) indicative of the successful transmission of the audio information and thus, will transmit the next audio information. In some embodiments, each of primary wireless headphone 104 and secondary wireless headphone 106 may transmit a partial-acknowledgement (ACK_P) packet, and an acknowledgment (ACK) packet may be received by audio source 102 only when both ACK_P packets are transmitted. In some embodiments, in response to the unsuccessful reception of the audio information, secondary wireless headphone 106 may transmit an interfering packet that interferes with the reception of the ACK packet transmitted by primary wireless headphone 104 at audio source 102. The detail of audio information acknowledgement by both primary wireless headphone 104 and secondary wireless headphone 106 is described below.

In some embodiments, audio information may be transmitted by audio source 102 according to the Bluetooth protocol at the working radio frequency (RF) band between 2402 MHz and 2480 MHz or between 2400 MHz and 2483.5 MHz (referred to herein as "2.4 GHz"). Bluetooth is a wireless technology standard for exchanging data over short distances, and the Bluetooth protocol is one example of short-range wireless communication protocols. In one example, audio source 102 may apply the advanced audio distribution profile (A2DP) of the Bluetooth protocol for transmitting the audio information. For example, based on the A2DP, a Bluetooth audio streaming of music or voice may be streamed from audio source 102 to primary and secondary wireless headphones 104 and 106 over Bluetooth connections. In some embodiments, audio information may be transmitted by audio source 102 according to the WiFi protocol at the working RF band of 2.4 GHz or 5 GHz. WiFi is a wireless technology for wireless local area networking based on the IEEE 802.11 standards, and the WiFi protocol (also known as the 802.11 protocol) is another example of short-range wireless communication protocols. It is understood that the transmission of the audio information by audio source 102 may be using any other suitable short-range wireless communication besides Bluetooth and WiFi.

Primary wireless headphone 104 and/or secondary wireless headphone 106 may transmit the messages (e.g., ACK, NACK, ACK_P, or interfering packets) to audio source 102 by a carrier wave. In some embodiments, messages may be transmitted by primary wireless headphone 104 and/or secondary wireless headphone 106 using the same short-range wireless communication protocol as used by transmission of the audio information by audio source 102, such as the Bluetooth or WiFi protocol.

As shown in FIG. 1, to enable secondary wireless headphone 106 work in the snoop mode, primary wireless headphone 104 may transmit, to secondary wireless headphone 106, communication parameters associated with the normal bidirectional communication link between audio source 102 and primary wireless headphone 104. The communication parameters may include, but are not limited to, the address of audio source 102 (e.g., the IP address or media access control (MAC) address) and the encryption parameters between audio source 102 and primary wireless headphone 104. In some embodiments, the transmission of the communication parameters may be at a frequency lower than the frequency used for transmitting the audio information by audio source 102 (e.g., 2.4 GHz). For example, NFMI communication may be used for transmitting of the communication parameters. NFMI communication is a short-range wireless communication by coupling a tight, low-power, non-propagating magnetic field between devices. NFMI communication can contain transmission energy within the localized magnetic field, which does not radiate into free space. In some embodiments, the carrier wave frequency for NFMI communication is between about 5 MHz and about 50 MHz (e.g., between 5 MHz and 50 MHz), such as between 5 MHz and 40 MHz, between 5 MHz and 30 MHz, between 5 MHz and 20 MHz, between 5 MHz and 10 MHz, between 15 MHz and 50 MHz, between 25 MHz and 50 MHz, between 35 MHz and 50 MHz, and between 45 MHz and 50 MHz. In some embodiments, the carrier wave frequency is about 10 MHz (e.g., 10 MHz) or about 13.56 MHz (e.g., 13.56 MHz).

Upon receiving the communication parameters from primary wireless headphone 104, secondary wireless headphone 106 can establish the snoop bidirectional communication link with audio source 102 based on the communication parameters. For example, secondary wireless headphone 106 may pretend to be primary wireless headphone 104 so that primary audio source 102 does not recognize secondary wireless headphone 106 as a newly-connected device and thus, will not disconnect and reconnect with secondary wireless headphone 106. In some embodiments, primary wireless headphone 104 does not receive the messages (e.g., ACK, NACK, ACK_P, or interfering packets) from secondary wireless headphone 106. Secondary wireless headphone 106 may transmit the messages to audio source 102, but not to primary wireless headphone 104.

In some embodiments, primary wireless headphone 104 and secondary wireless headphone 106 may have the same hardware structures, but in different working modes. That is, the same headphone can work as either primary wireless headphone 104 or secondary wireless headphone 106 depending on its working mode, e.g., normal mode or snoop mode. In some embodiments, primary wireless headphone 104 and secondary wireless headphone 106 may switch their roles upon certain conditions as described below in detail. That is, primary wireless headphone 104 may switch to the snoop mode to become a secondary wireless headphone, while at the same time, secondary wireless headphone 106 may switch to the normal node to become a primary wireless headphone.

As shown in FIG. 1, primary wireless headphone 104 and secondary wireless headphone 106 may be two separate devices that do not communication with one another directly except for transmitting the communication parameters from primary wireless headphone 104 to secondary wireless headphone 106. Thus, it may be difficult for primary wireless headphone 104 and secondary wireless headphone 106 to synchronize with one another directly. In some embodiments, primary wireless headphone 104 and secondary wireless headphone 106 may be indirectly synchronized via their communications with audio source 102. For example, the local clock of primary wireless headphone 104 may be synchronized with audio source 102 based on the audio information received from audio source 102, and the local clock of secondary wireless headphone 106 may be synchronized with audio source 102 as well based on the audio information received from audio source 102. As both local clocks of primary and secondary wireless headphones 104 and 106 are synchronized with audio source 102, the local clock of primary wireless headphone 104 is also synchronized with the local clock of secondary wireless headphone 106. The detail of synchronizing the local clock of primary wireless headphone 104 or secondary wireless headphone 106 with audio source 102 is described below.

Figure 1B:
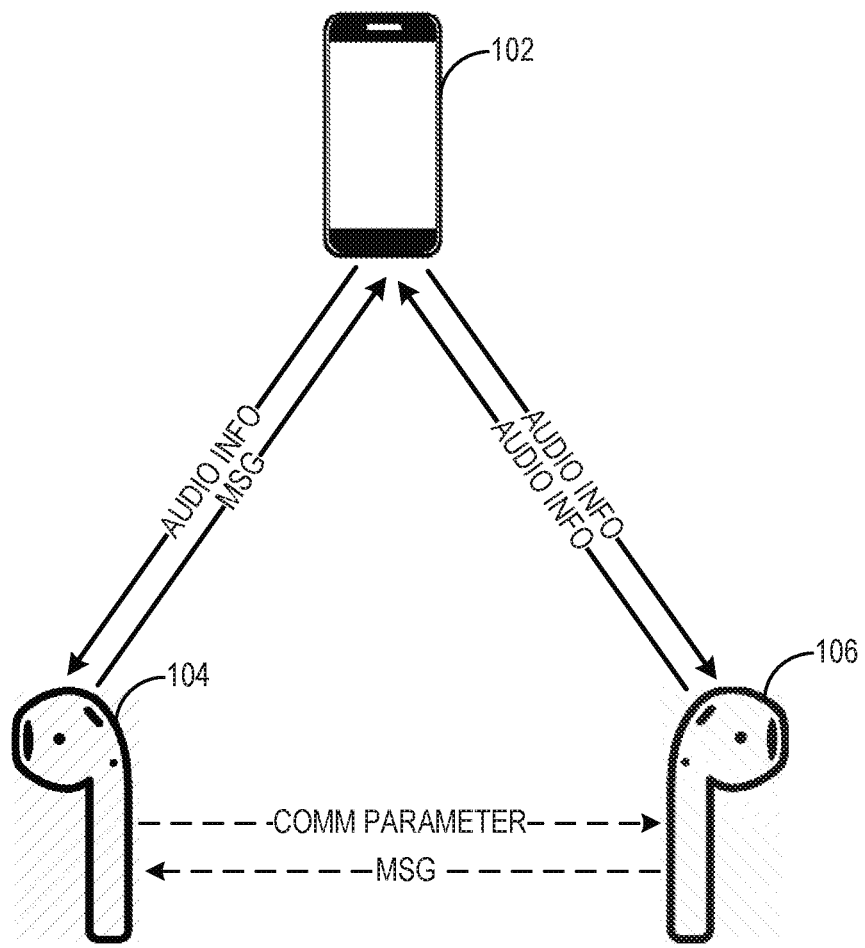

FIG. 1B is a block diagram illustrating exemplary wireless audio system 100 in accordance with another embodiment. The same functions of audio source 102, primary wireless headphone 104, and secondary wireless headphone 106 that have been described above with respect to FIG. 1A will not be repeated with respect to FIG. 1B. Different from the example of FIG. 1A, in this example, instead of transmitting the message to audio source 102, secondary wireless headphone 106 transmits a message to primary wireless headphone 104 indicative of whether secondary wireless headphone 106 successfully receives the audio information from audio source 102. The message may be an ACK packet indicative of successful reception or a NACK packet indicative of unsuccessful reception, or any other suitable indication that can be understood by primary wireless headphone 104 about the reception status of secondary wireless headphone 106. Based on the message received from secondary wireless headphone 106 and the reception status of primary wireless headphone 104, primary wireless headphone 104 may generate a message indicative of whether both primary and secondary wireless headphone 104 and 106 receive the audio information from audio source 102. For example, the generated message may be an ACK packet when the audio information is successfully received by both primary and secondary wireless headphone 104 and 106, or a NACK packet when the audio information is not successfully received by any one or both of primary and secondary wireless headphone 104 and 106. Primary wireless headphone 104 then may transmit the message to audio source 102 using the short-range communication protocol, such as the Bluetooth or WiFi protocol.

In some embodiments, the communications between primary wireless headphone 104 and secondary wireless headphone 106 may be carried out by a carrier wave at a frequency lower than the frequency used for transmitting the audio information by audio source 102, for example, using the NFMI communication. For example, secondary wireless headphone 106 may transmit the messages (e.g., ACK or NACK packets) to primary wireless headphone 104 using a carrier wave with a frequency (e.g., 10 MHz) lower than the working RF band of Bluetooth or WiFi (e.g., 2.4 GHz). Besides the differences related to the different carrier wave frequencies, the transmission of messages to primary wireless headphone 104 from secondary wireless headphone 106 and/or the transmission of communication parameters to secondary wireless headphone 106 from primary wireless headphone 104 may use a short-range wireless communication protocol that is substantially the same as the short-range wireless communication protocol used for the transmission of audio information by audio source 102, such as the Bluetooth protocol or WiFi protocol. That is, a short-range wireless communication protocol (e.g., the Bluetooth or WiFi protocol) may be amended to change the carrier wave frequency (and any specification related to the carrier wave frequency) to generate a substantially the same short-range wireless communication protocol (an amended short-range wireless communication protocol, e.g., an amended Bluetooth protocol or amended WiFi protocol) used for the communications between primary wireless headphone 104 and secondary wireless headphone 106.

Wireless audio system 100 in this example can support voice calls. For example, the audio information transmitted by audio source 102 may be voice information. At least one of primary and secondary wireless headphones 104 and 106 may be combined with a microphone to collect user voice and generate voice information during the voice calls. Primary wireless headphone 104 and secondary wireless headphone 106 may transmit another audio information (e.g., the voice information) to audio source 102 using the same short-range wireless communication protocol, such as the Bluetooth or WiFi protocol. In some embodiments (as shown in FIG. 1B), secondary wireless headphone 106 may transmit the voice information to audio source 102 via the established snoop bidirectional communication link with audio source 102 during the voice calls. The transmission of the voice information to audio source 102 by secondary wireless headphone 106 may occur at the same time (or substantially the same time) as the transmission of the message to primary wireless headphone 104 by secondary wireless headphone 106 according to some embodiments.

Figure 2:
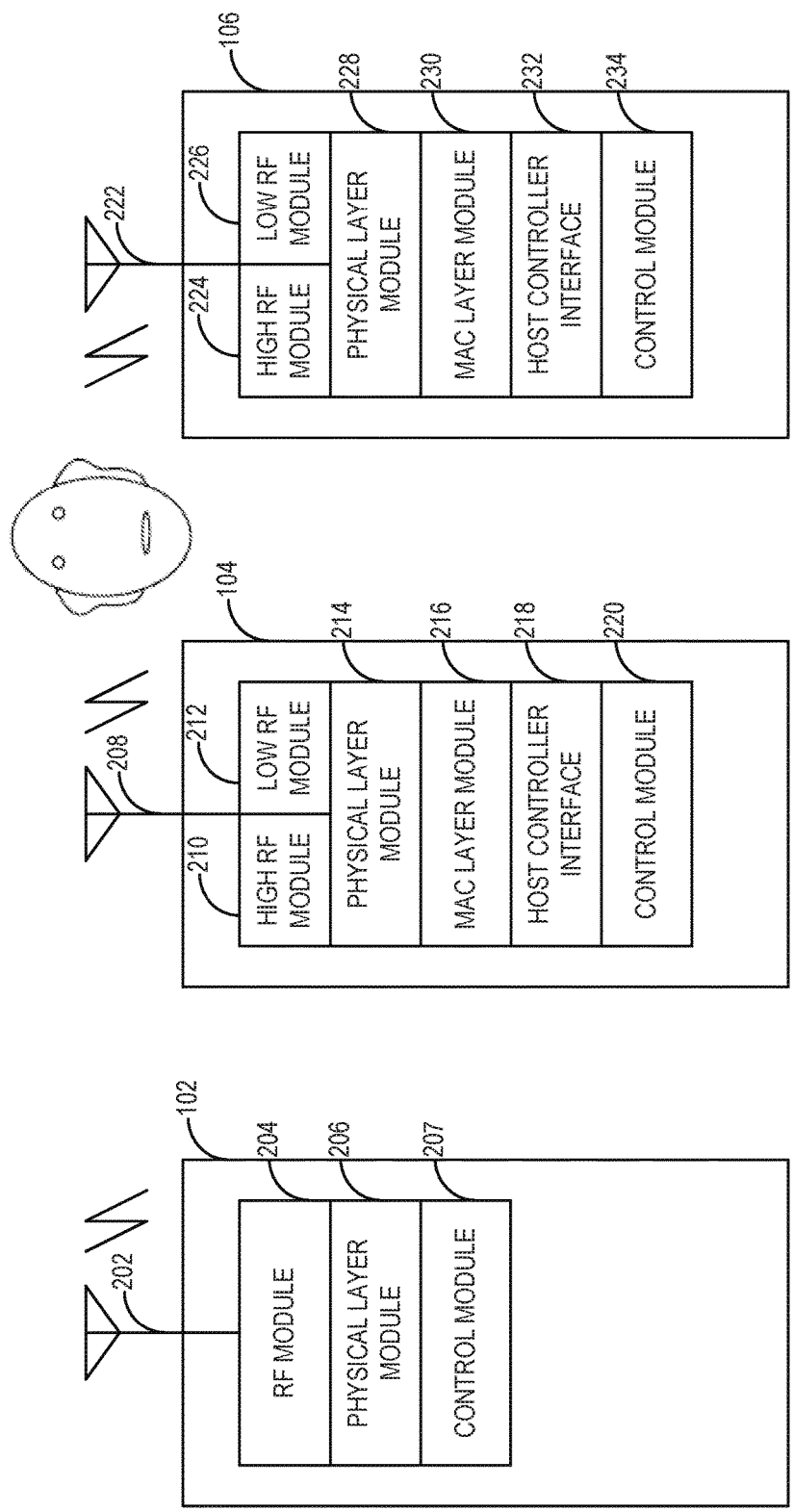
FIG. 2 is a detailed block diagram of the exemplary wireless audio system in FIG. 1 in accordance with an embodiment.

FIG. 2 is a detailed block diagram of exemplary wireless audio system 100 in FIG. 1 in accordance with an embodiment. Audio source 102 in this example includes an antenna 202, an RF module 204, a physical layer module 206, and a control module 207. It is understood that additional module (s) may be included in audio source 102, either in the same IC chip in which RF module 204, physical layer module 206, and control module 207 are formed or in a separate IC chip.

Antenna 202 may include an array of conductors for transmitting and receiving radio waves at one or more RF bands corresponding to RF module 204. For example, antenna 202 may transmit audio information modulated by a carrier wave using RF module 204. As described above, the audio information may be any music and/or voice information provided by audio source 102. For example, the audio information may be a stream of audio stereo information in the form of compressed or uncompressed stereo samples for first and second audio channels, such as left-channel audio information and right-channel audio information or the like. In some embodiments, the audio information may be mono audio information in a single audio channel or audio information in more than two separate audio channels (e.g., left, central, and right channels). Antenna 202 may also receive the messages modulated by a carrier wave. For example, the messages may be any messages used for acknowledging the reception of the audio information by primary wireless headphone 104 or secondary wireless headphone 106, such as ACK, NACK, ACK_P, or interfering packets.

RF module 204, physical layer module 206, and control module 207 may be in the same integrated circuit (IC) chip that implements a short-range wireless communication protocol, such as the Bluetooth protocol or WiFi protocol. RF module 204 may be configured to modulate the audio information using the carrier wave at the first frequency, for example, at 2.4 GHz for Bluetooth or WiFi communication, and transmit the audio information at the first frequency via antenna 202. RF module 204 may be further configured to receive and demodulate the messages and/or the audio information (e.g., the voice information during voice calls) from the carrier wave at the first frequency, for example, at 2.4 GHz. Physical layer module 206 may be configured to generate the physical link (baseband) between audio source 102 and primary wireless headphone 104 (and secondary wireless headphone 106 even though audio source 102 may not be aware of the connection with secondary wireless headphone 106) according to the short-range wireless communication protocol. For example, physical layer module 206 may generate baseband packets (e.g., Bluetooth packets) based on the music and/or voice data (payload) and perform error correction using any known methods, such as forward error correction (FEC) and automatic repeat request (ARQ).

Control module 207 may be configured to determine the re-transmission of audio information based on the messages received from primary wireless headphone 104 and secondary wireless headphone 106. In some embodiments, the transmission of the audio information may occur at the audio data packet level in time slots. For example, according to the Bluetooth protocol, the physical channel of the Bluetooth connection is divided into time slots, each of which has the same length (e.g., 625 µs). RF module 204 in conjunction with antenna 202 may transmit an audio data packet (N) in a time slot (N). Based on the receptions of the audio data packet (N) in the time slot (N) at primary wireless headphone 104 and secondary wireless headphone 106, in the subsequent time slot (N+1), RF module 204 in conjunction with antenna 202 may receive a message from primary wireless headphone 104 alone, or messages from both primary wireless headphone 104 and secondary wireless headphone 106, which are generated in response to the reception status of the audio data packet (N) in the time slot (N).

In the latter case in which messages from both primary wireless headphone 104 and secondary wireless headphone 106 are provided, each message may be a partial-acknowledgement (ACK_P) packet that can together form a complete acknowledgement (ACK) packet. In some embodiments, the message from secondary wireless headphone 106 may be an interfering packet that can interfere with the message from primary wireless headphone 104, so that the message from primary wireless headphone 104 cannot be recognized by control module 207 as a complete acknowledgement (ACK) packet. Thus, from the perspective of control module 207, the message may be a packet indicative of whether primary wireless headphone 104 successfully receives the audio data packet (N) in the time slot (N) (because secondary wireless headphone 106 is in the snoop mode and thus, may not be known by audio source). The packet may be either the single packet from primary wireless headphone 104 (e.g., an ACK or NACK packet), a partial packet (e.g., an ACK_P packet from primary wireless headphone 104 or secondary wireless headphone 106), a combined packet of two ACK_P packets from primary wireless headphone 104 and secondary wireless headphone 106, or an interfered packet (e.g., an ACK or NACK packet from primary wireless headphone 104 that is interfered by the interfering packet from secondary wireless headphone 106).

Control module 207 may control RF module 204 and antenna 202 to re-transmit the audio data packet (N) in the subsequent time slot (N+1) unless the ultimate message received is a complete ACK packet. For example, if the ultimate message received is not a complete ACK packet (e.g., an NACK packet, a partial packet, or an interfered packet), then control module 207 controls RF module 204 to re-transmit the audio data packet (N) in the subsequent time slot (N+1). If the message received is a complete ACK packet, then control module 207 controls RF module 204 to transmit the subsequent audio data packet (N+1) in the subsequent time slot (N+1). As a result, even though secondary wireless headphone 106 may work in the snoop mode (and thus, may not be recognized by audio source 102), audio source 102 will still re-transmit audio information if any one of primary wireless headphone 104 and secondary wireless headphone 106 did not successfully receive the audio information, thereby ensuring the audio data transmission reliability with both primary wireless headphone 104 and secondary wireless headphone 106 regardless of their working modes.

Primary wireless headphone 104 in this example may include a wireless transceiver (primary wireless transceiver) configured to receive the audio information transmitted by audio source 102 at the first frequency and transmit the message in response to the reception of the audio information to audio source 102 (and another audio information (e.g., voice information) during voice calls) at the first frequency. The wireless transceiver may be further configured to transmit the communication parameters to secondary wireless headphone 106 (and receive the message from secondary wireless headphone 106 in some embodiments) at the second frequency. Primary wireless headphone 104 may include other components, such as an enclosure, speakers, and a microphone (not shown). Primary wireless transceiver may include an antenna 208, a high RF module 210, a low RF module 212, a physical layer module 214, a MAC layer module 216, a host controller interface (HCI) 218, and a control module 220. Some or all of the modules mentioned above may be integrated in the same IC chip to reduce the chip size and/or power consumption. Primary wireless headphone 104 may present at least part of the audio information received from audio source 102 to the user via one of the user's ear. For example, the speaker of primary wireless headphone 104 may play music and/or voice based on the entire audio information or one audio channel of the audio information.

Antenna 208 may include an array of conductors for transmitting and receiving radio waves at two or more RF bands corresponding to high RF module 210 and low RF module 212. High RF module 210 may be configured to receive, from audio source 102, audio information and transmit, to audio source 102, a first message (e.g., ACK, NACK, or ACK_P packet) at the first frequency via antenna 208. In some embodiments, high RF module 210 may be further configured to transmit, to audio source 102, another audio information (e.g., voice information) at the first frequency via antenna 208. Low RF module 212 may be configured to transmit, to secondary wireless headphone 106, the communication parameters at the second frequency lower than the first frequency via antenna 208. In some embodiments, low RF module 212 may be further configured to receive, from secondary wireless headphone 106, the message (e.g., ACK or NACK packet) at the second frequency via antenna 208. As referred to herein, the first frequency used for the communications between audio source 102 and primary wireless headphone 104 is a "high" RF, such as 2.4 GHz used in Bluetooth or WiFi communication; the second frequency used for the communications between primary wireless headphone 104 and secondary wireless headphone 106 is a "low" RF, such as between 5 MHz and 50 MHz for NFMI communication. Both high RF module 210 and low RF module 212 may implement substantially the same short-range wireless communication protocol for short-range wireless communications at different RF bands. For example, high RF module 210 may implement a first short-range wireless communication protocol (e.g., the Bluetooth protocol or WiFi protocol), and low RF module 212 may implement a second short-range wireless communication protocol amended from the first short-range wireless communication protocol (e.g., the amended Bluetooth or amended WiFi protocol). The second short-range wireless communication protocol may be substantially the same as the first short-range wireless communication protocol except the carrier wave frequency (and any specification related to the carrier wave frequency).

In some embodiments, high RF module 210 may operate at about 2.4 GHz (e.g., 2.4 GHz). In some embodiments, low RF module 212 may operate between about 5 MHz (e.g., 5 MHz) and about 50 MHz (e.g., 50 MHz) for NFMI communication. For example, low RF module 212 may operate at about 10 MHz (e.g., 10 MHz). In some embodiments, low RF module 212 may implement the frequency-hopping spread spectrum (FHSS) technique, such that the second frequency (low RF) may include a plurality of frequencies based on FHSS. For example, low RF module 212 may implement the amended Bluetooth protocol and use the FHSS specification in the amended Bluetooth protocol. FHSS can further reduce signal interference.

Physical layer module 214 may be configured to generate the physical links (baseband) between audio source 102 and primary wireless headphone 104 according to the short-range wireless communication protocol and the amended short-range wireless communication protocol used by high RF module 210 and low RF module 212, respectively. For example, physical layer module 214 may generate baseband packets (e.g., Bluetooth packets) based on the music and/or voice data (payload) and perform error correction using any known methods, such as FEC and ARQ. MAC layer module 216 may be configured to generate the logical data channel links between audio source 102 and primary wireless headphone 104 according to the short-range wireless communication protocol and between primary wireless headphone 104 and secondary wireless headphone 106 according to the amended short-range wireless communication protocol used by high RF module 210 and low RF module 212, respectively. For example, MAC layer module 216 may generate link control channel, link manager channel, user asynchronous channel, user isochronous channel, and user synchronous channel based on the Bluetooth protocol (and the amended Bluetooth protocol). HCI 218 may be configured to provide a common interface to physical layer module 214 and MAC layer module 216 and access to hardware status and control registers. For example, when implementing the Bluetooth protocol (and the amended Bluetooth protocol), HCI 218 may provide a uniform method of accessing the Bluetooth baseband capabilities.

In this example, primary wireless headphone 104 is referred to as "primary" because it works in the normal mode and its RF modules establish a normal bidirectional communication link with audio source 102, so that audio source 102 recognizes the connection with primary wireless headphone 104. In some embodiments, control module 220 may control primary wireless headphone 104 to switch to the snoop mode to become a "secondary" headphone. In some embodiments, control module 220 may determine whether to switch the working mode of primary wireless headphone 104 based on one or more parameters associated with primary wireless headphone 104 and/or secondary wireless headphone 106, such as signal quality and/or power consumption. In one example, control module 220 may determine whether the signal quality (e.g., signal-to-noise ratio (SNR) or received signal strength indicator (RSSI)) is above a threshold and cause primary wireless headphone 104 to switch to the snoop mode when the signal quality becomes better than the signal quality of secondary wireless headphone 106. That is, in some embodiments, the wireless headphone with the relatively poor signal quality may be used as the primary wireless headphone working in the normal mode, while the wireless headphone with the relatively good signal quality may be used as the secondary wireless headphone working in the snoop mode, so that the ACK packets transmitted by the primary wireless headphone can be more easily interfered by the interfering packets transmitted by the secondary wireless headphone. The signal quality of the secondary wireless headphone is better than the signal quality of the primary wireless headphone. In another example, control module 220 may use the relative power consumption between primary and secondary wireless headphones 104 and 106 to determine whether to cause primary wireless headphone 104 to switch to the snoop mode.

Control module 220 may be further configured to determine the first message indicative of whether the audio information is successfully received by primary wireless headphone 104. In some embodiments, the first message may be an ACK packet indicative of the successful reception of the audio information from audio source 102 or may be an NACK packet indicative of the unsuccessful reception of the audio information from audio source 102. In some embodiments, the first message may be an ACK_P packet indicative of the successful reception of the audio information from audio source 102 and may be an NACK packet indicative of the unsuccessful reception of the audio information from audio source 102. That is, the first message may be a NACK packet when the audio information is not successfully received and may be either an ACK packet (a complete acknowledgement packet) or an ACK_P packet (a partial-acknowledgement packet) when the audio information is successfully received depending on the acknowledging scheme (e.g., partial-acknowledgement scheme or interference scheme) used by primary wireless headphone 104.

Secondary wireless headphone 106 in this example may include a wireless transceiver (secondary wireless transceiver) configured to receive (snoop) the audio information transmitted by audio source 102 and transmit a second message (e.g., an ACK_P or interfering packet) (and another audio information (e.g., voice information) during voice calls) to audio source 102 at the first frequency (high RF, e.g., 2.4 GHz). The wireless transceiver may be further configured to receive the communication parameters from primary wireless headphone 104 (and transmit the message to primary wireless headphone 104 in some embodiments) at the second frequency (low RF, e.g., 10 MHz). Secondary wireless headphone 106 may include other components, such as an enclosure, speakers, and a microphone (not shown). Secondary wireless transceiver may include an antenna 222, a high RF module 224, a low RF module 226, a physical layer module 228, a MAC layer module 230, an HCI 232, and a control module 234. Some or all of the modules mentioned above may be integrated in the same IC chip to reduce the chip size and/or power consumption. Secondary wireless headphone 106 may present at least part of the audio information to the user via one of the user's ear. For example, the speaker of secondary wireless headphone 106 may play music and/or voice based on the audio information or one audio channel of the audio information.

In this example, secondary wireless headphone 106 has the same hardware structures as primary wireless headphone 104. The functions of each module mentioned above in secondary wireless headphone 106 are the same as the counterparts in primary wireless headphone 104 and thus, will not be repeated. Different from primary wireless headphone 104, secondary wireless headphone 106 in this example works in the snoop mode, so that audio source 102 may not recognize the connection with secondary wireless headphone 106. To enable secondary wireless headphone 106 to work in the snoop mode, in some embodiments, low RF module 212 of primary wireless headphone 104 may transmit, to low RF module 226 of secondary wireless headphone 106, one or more communication parameters associated with the short-range wireless communication protocol used between audio source 102 and primary wireless headphone 104. The communication parameters may include any parameters necessary for enabling secondary wireless headphone 106 to snoop the communications between audio source 102 and primary wireless headphone 104, such as the address of audio source 102 (e.g., the IP address or MAC address) and the encryption parameters used between audio source 102 and primary wireless headphone 104.

As described above, similar to control module 220 of primary wireless headphone 104, control module 234 of secondary wireless headphone 106 may switch secondary wireless headphone 106 into the normal mode to become a "primary" headphone. The switch may be determined based on one or more parameters, such as the relative signal quality and/or relative power consumption between primary wireless headphone 104 and secondary wireless headphone 106. For example, both control modules 220 and 234 may work together to switch the roles of primary wireless headphone 104 and secondary wireless headphone 106 to improve the overall performance of the pair of wireless headphones 104 and 106 as described above in detail.

Control module 234 may be further configured to determine the messages to be transmitted to audio source 102 (and primary wireless headphone 104 in some embodiments) by secondary wireless headphone 106. In some embodiments, control module 234 may control low RF module 226 to transmit a second message when the audio information is successfully received by high RF module 224 of secondary wireless headphone 106. The second message may be an ACK_P packet (a partial-acknowledgement packet) that forms a complete ACK packet with the ACK_P packet transmitted by primary wireless headphone 104 indicative of the successful reception of the audio information by primary wireless headphone 104. On the other hand, when the audio information is not successfully received by high RF module 224 of secondary wireless headphone 106, control module 234 may prevent low RF module 226 from transmitting any message (e.g., ACK_P packet) to audio source 102. In some embodiments, control module 234 may control low RF module 226 to transmit a third message when the audio information is not successfully received by high RF module 224 of secondary wireless headphone 106. The third message may be an interfering packet that interferes with the reception of the first message from primary wireless headphone 104 at audio source 102. The interfering packet may include a complete or partial NACK packet and a complete or partial dedicated interfering packet. On the other hand, when the audio information is successfully received by high RF module 224 of secondary wireless headphone 106, control module 234 may prevent low RF module 226 from transmitting any message (e.g., interfering packet) to audio source 102. In some embodiments, control module 234 may control low RF module 226 to transmit, to low RF module 212 of primary wireless headphone 104, a fourth message indicative of whether secondary wireless headphone 106 successfully receives the audio information from audio source 102. Control module 220 of primary wireless headphone 104 then may control high RF module 210 of primary wireless headphone 104 to transmit a message to audio source 102 indicative of whether both primary and secondary wireless headphones 104 and 106 successfully receive the audio information.

Figure 3:
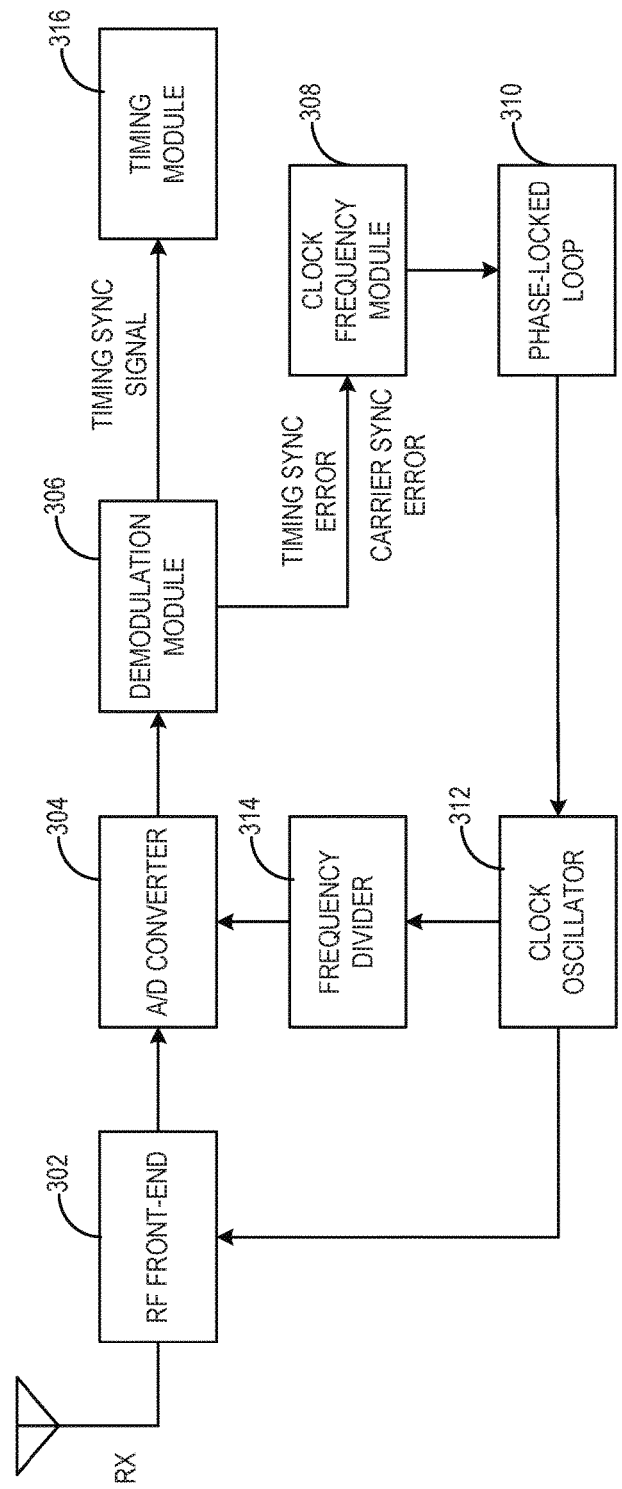
FIG. 3 is a block diagram illustrating an exemplary wireless headphone in accordance with an embodiment.

FIG. 3 is a block diagram illustrating exemplary wireless headphone 104 or 106 in accordance with an embodiment. In this example, each of primary wireless headphone 104 and secondary wireless headphone 106 includes an RF front-end 302, an analog-to-digital (A/D) converter 304, a demodulation module 306, a clock frequency module 308, a phase-locked loop (PLL) 310, a clock oscillator 312, a frequency divider 314, and a timing module 316. RF front-end 302 may be operatively coupled to an antenna and configured to receive the RF signals, such as audio signals representing the audio information described above in detail. RF front-end 302 may include an antenna switch, low-noise amplifier (LNA), power amplifier (PA), filter, etc. A/D converter 304 may be operatively coupled to RF front-end 302 and configured to convert an audio signal from an analog signal to a digital signal and provide the digital audio signal to demodulation module 306 that is operatively coupled to A/D converter 304. The A/D conversion may be performed by A/D converter 304 based on an A/D sampling rate determined by frequency divider 314.

In some embodiments, primary wireless headphone 104 and secondary wireless headphone 106 may not communicate directly except for transmitting the communication parameters from primary wireless headphone 104 to secondary wireless headphone 106 as describe above with respect to FIG. 1A. Primary wireless headphone 104 and secondary wireless headphone 106 may be synchronized via their communications with audio source 102. The local clocks of each of primary wireless headphone 104 and secondary wireless headphone 106 may be synchronized with the remote clock of audio source 102 and thus, are synchronized with one another. By indirectly synchronizing primary wireless headphone 104 and secondary wireless headphone 106 via audio source 102, the sound can be simultaneously played by both primary wireless headphone 104 and secondary wireless headphone 106. Moreover, when primary wireless headphone 104 and secondary wireless headphone 106 implement the partial-acknowledgement scheme, synchronization of primary wireless headphone 104 and secondary wireless headphone 106 is important because the two ACK_P packets need to be simultaneously transmitted from primary wireless headphone 104 and secondary wireless headphone 106 in order to be combined into a complete ACK packet at audio source 102. Also, when secondary wireless headphone 106 implements the interference scheme, synchronization of primary wireless headphone 104 and secondary wireless headphone 106 is also important because the interfering packet needs to be transmitted by secondary wireless headphone 106 at substantially the same time as the first message from primary wireless headphone 104 (e.g., offset within a few bits as described below) in order to interfere with the reception of the first message at audio source 102. In some embodiments described below in detail, synchronization of primary wireless headphone 104 and secondary wireless headphone 106 via audio source 102 may be achieved by various modules in exemplary wireless headphone 104 or 106 as shown in FIG. 3.

In this example, demodulation module 306 may be configured to obtain at least one synchronization error based on the received audio signal (e.g., in the digital form). The synchronization error may include a timing synchronization error and a carrier synchronization error. For example, in the Bluetooth communication, the timing synchronization error may be the timing offset between the local sequence in primary wireless headphone 104 or secondary wireless headphone 106 and the known sequence (e.g., the access code, including the preamble code and synchronization code, according to the Bluetooth protocol) in the received audio signal from the audio source. In some embodiments, demodulation module 306 may obtain a timing synchronization signal from the received audio signal as well. Demodulation module 306 may perform the synchronization function to calculate the timing synchronization error. In some embodiments, the timing synchronization error may be obtained for each of the time slots in which the audio signal is transmitted if the audio signal is transmitted by the single-slot packets transmission scheme (i.e., each data packet is transmitted in one time slot). It is understood that the single-slot packets transmission rate may be higher than the audio signal transmission rate since not all the time slots may be used for transmitting the audio signal. For example, the kth time slot may be used for transmitting an audio signal from audio source 102, while the (k+1)th time slot may be used for transmitting a message (e.g., an ACK, NACK, ACK_P, or interfering packet) to audio source 102. In some embodiments, the timing synchronization error may be obtained for each of the multiple time slots (occupied by a single data packet) in which the audio signal is transmitted if the audio signal is transmitted using the multiple-slots packets transmission scheme. In the example of the Bluetooth communication, the timing synchronization error may be calculated based on a sequence known by audio source 102 and primary wireless headphone 104 or secondary wireless headphone 106 (e.g., the access code according to the Bluetooth protocol). Demodulation module 306 may perform the demodulation function to calculate the carrier synchronization error. Carrier synchronization error may be determined based on the frequency offset between the carrier wave of the received audio signal and the local oscillation of primary wireless headphone 104 or secondary wireless headphone 106 (e.g., the crystal oscillation frequency of clock oscillator 312).

Clock frequency module 308 in this example may be operatively coupled to demodulation module 306 and PLL 310 and configured to adjust the frequency of the local clock based on the at least one synchronization error (e.g., the timing synchronization error and/or the carrier synchronization error). Clock frequency module 308 may adjust the local oscillation frequency of clock oscillator 312 via PLL 310 to match the remote oscillation frequency of the clock of audio source 102. In some embodiments, the timing synchronization error alone may be used by clock frequency module 308 to adjust the local clock. In the example of the Bluetooth communication, the received sequence in the received audio signal known by audio source 102 and primary or secondary wireless headphone 104 or 106 may be used to match or correlate the local sequence which may have timing offset with the received known sequence. The timing offset between the local sequence and the received known sequence is the timing synchronization error in this example. In some embodiments, the carrier timing synchronization error may be used as well by clock frequency module 308 to tune the local clock to further improve the clock synchronization.

In this example, timing module 316 may be operatively coupled to demodulation module 306 and configured to synchronize the timing synchronization signal with the audio signal. Timing module 316 may receive the timing synchronization signal from demodulation module 306 and align the timing synchronization signal with the slot start of the audio signal.

Figure 4A:
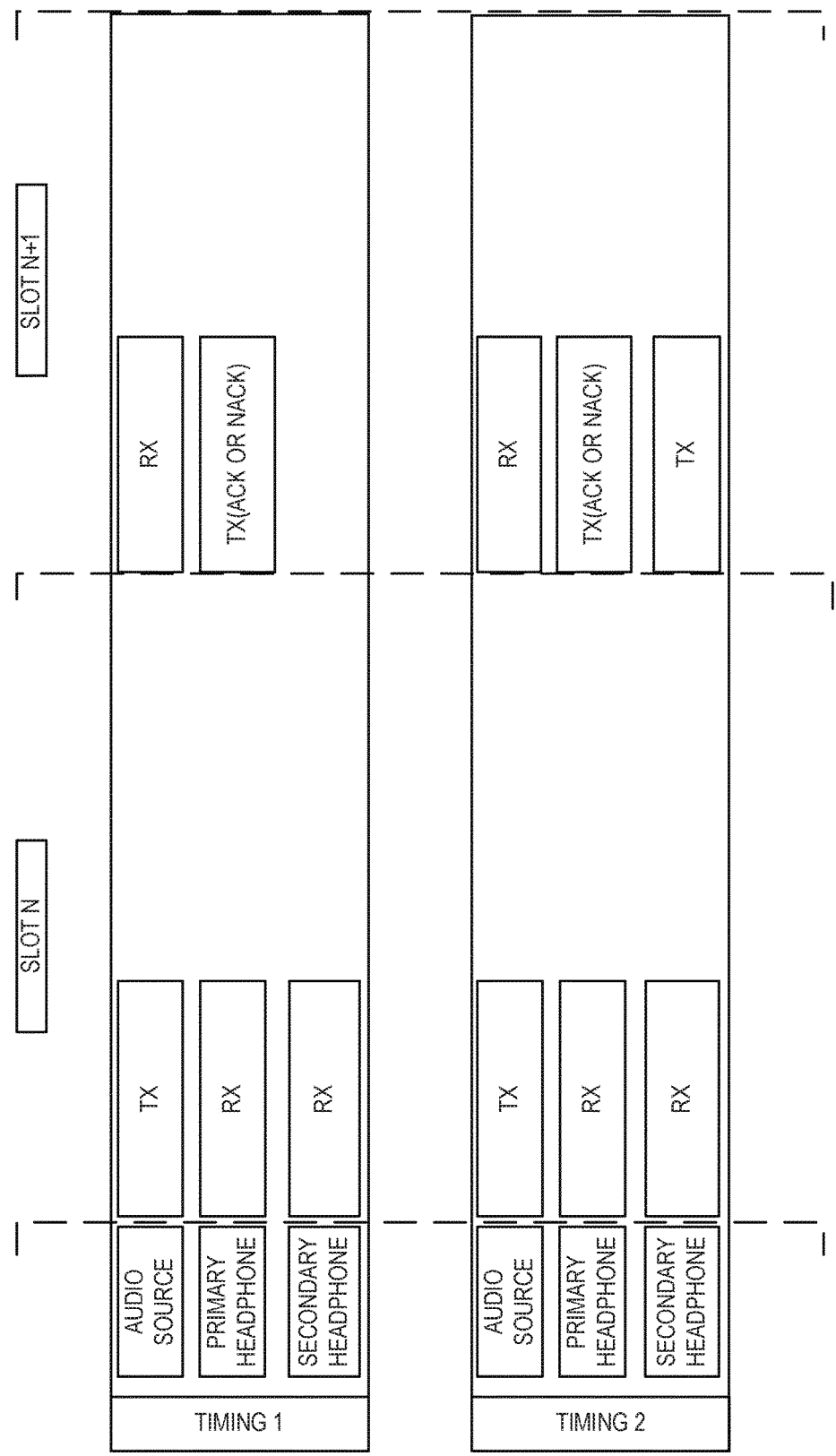
FIGS. 4A and 4B are timing diagrams of exemplary wireless audio systems in accordance with various embodiments.
Figure 4B:
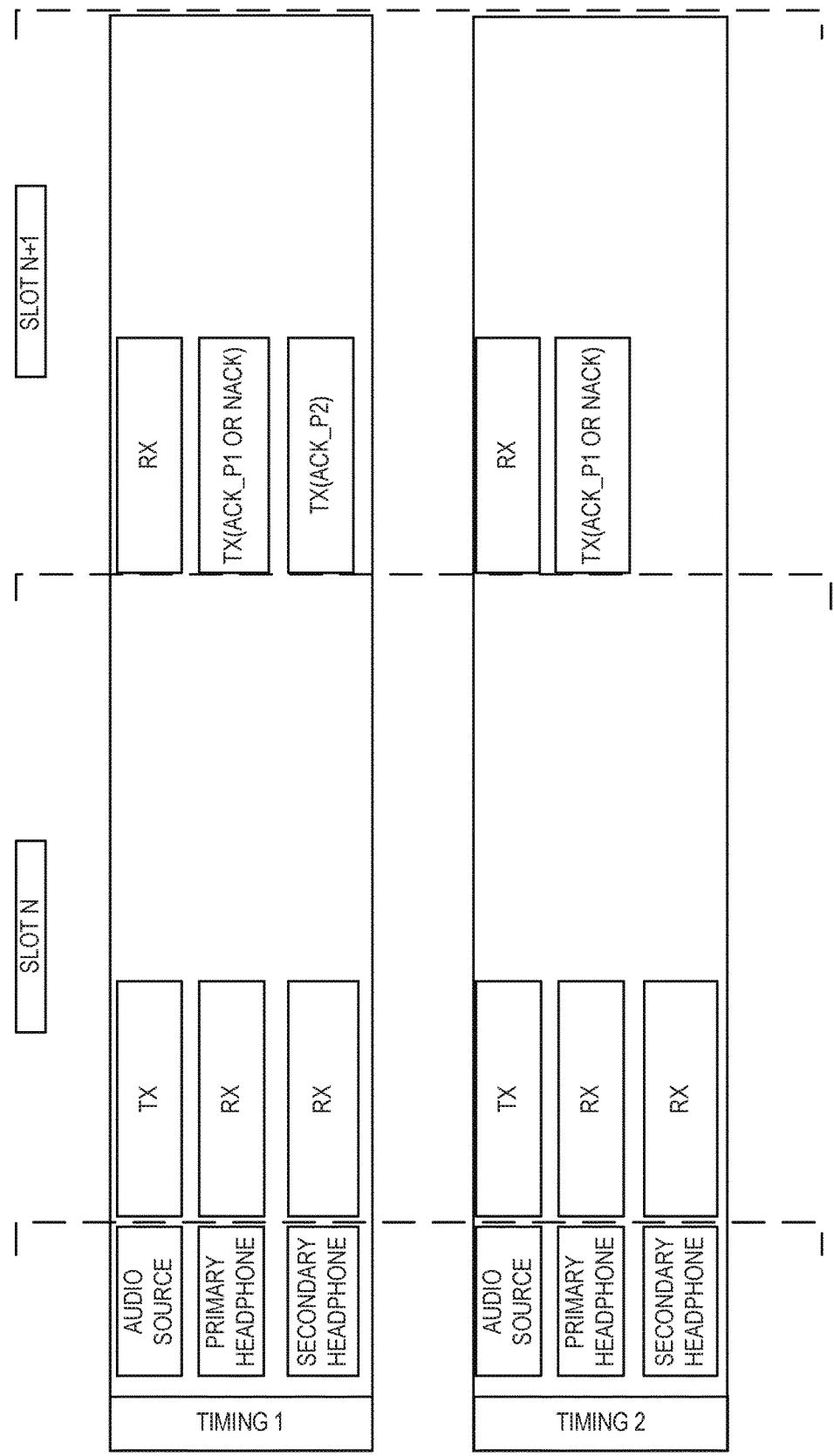

FIGS. 4A and 4B are timing diagrams of exemplary wireless audio systems in accordance with various embodiments. As described above with respect to FIG. 3, primary wireless headphone 104 and secondary wireless headphone 106 may be indirectly synchronized via their communications with audio source 102. As shown in FIGS. 4A and 4B, in a first time slot (N), audio source 102 transmits an audio data packet (e.g., a Bluetooth data packet), and each of primary wireless headphone 104 and secondary wireless headphone 106 receives the audio data packet. In a second time slot (N+1) subsequent to the first time slot (N), primary wireless headphone 104 and secondary wireless headphone 106 may transmit the acknowledgement messages to audio source 102 in response to the respective reception status of the audio data packet in the first time slot (N). The transmission of acknowledgement messages by primary wireless headphone 104 and secondary wireless headphone 106 may be realized using two schemes: interference scheme and partial-acknowledgement scheme described in FIG. 4A and FIG. 4B, respectively. As shown in FIGS. 4A and 4B, the acknowledgement message(s) are transmitted in the second time slot (N+1), but are not in the first time slot (N). Thus, there is ample time in the first time slot (N) for audio source 102 to transmit the audio data packet. In some embodiments, secondary wireless headphone 106 does not transmit any acknowledgement message to primary wireless headphone 104 in any time slot, including the first time slot (N).

Figure 5:
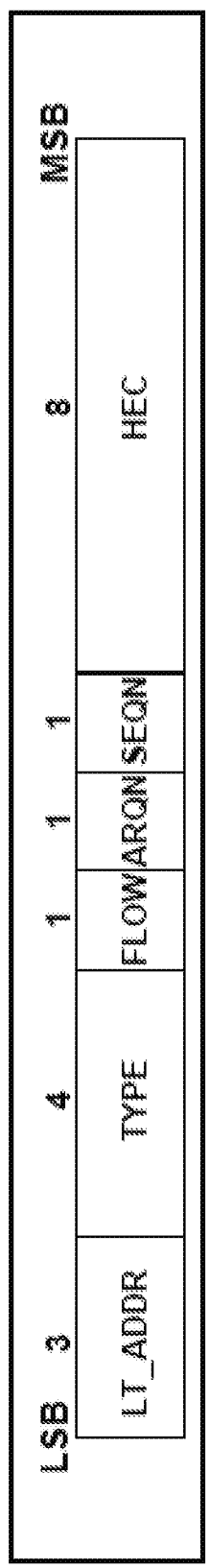
FIG. 5 is a depiction of an exemplary header of an acknowledgement (ACK) or negative acknowledgement (NACK) packet in accordance with an embodiment.

FIG. 4A illustrates the interference scheme. In timing 1, primary wireless headphone 104 transmits, in the time slot (N+1), a first message indicative of whether the audio data packet is successfully received in the time slot (N). The first message may be a complete ACK packet in response to the successful reception of the audio data packet or a NACK packet in response to the unsuccessful reception of the audio data packet. FIG. 5 is a depiction of an exemplary header of an ACK or NACK packet in accordance with an embodiment. The header includes an acknowledge indication bit (ARQN) indicative of whether the packet is an ACK packet or a NACK packet. The packet is an ACK packet if ARQN is 1, as shown in FIG. 5. The packet is an NACK packet if ARQN is 0.

Referring back to FIG. 4A, in timing 1, secondary wireless headphone 106 does not transmit, in the time slot (N+1), any message in response to the successful reception of the audio data packet in the time slot (N). In other words, secondary wireless headphone 106 does not interfere with the reception of the first message from primary wireless headphone 104 at audio source 102 when secondary wireless headphone 106 successfully receives the audio data packet. Thus, the first message alone (either an ACK or NACK packet) from primary wireless headphone 104 determines whether audio source 102 to re-transmit the audio data packet.

In timing 2, primary wireless headphone 104 transmits, in the time slot (N+1), a first message indicative of whether the audio data packet is successfully received in the time slot (N). The first message may be a complete ACK packet in response to the successful reception of the audio data packet or a NACK packet in response to the unsuccessful reception of the audio data packet. In timing 2, secondary wireless headphone 106 transmits, in the time slot (N+1), a second message in response to the unsuccessful reception of the audio data packet in the time slot (N). For example, secondary wireless headphone 106 may transmit an interfering message that interferes with the reception of the first message from primary wireless headphone 104 at audio source 102 when secondary wireless headphone 106 does not successfully receive the audio data packet. The purpose of the interfering packet is to prevent audio source 102 from receiving a complete ACK packet or cause audio source 102 to receive a NACK packet, so that audio source 102 will re-transmit the audio data packet. In some embodiments, the transmission power of secondary wireless headphone 106 may be large enough to successfully interfere with the reception of the ACK packet from primary wireless headphone 104 at audio source 102.

In some embodiments, the interfering packet may interfere with the ARQN of a Bluetooth packet (e.g., as shown in FIG. 5). The interfering packet may set ARQN to 0 to cause ARQN of the first message become 0 (e.g., turning an ACK packet into an NACK packet or keeping a NACK packet). In one example, in case primary wireless headphone 104 and secondary wireless headphone 106 are not perfectly synchronized (e.g., offset by one or two bits), one or more bits before and/or after ARQN in the interfering packet may be set as 0 as well to ensure that the ARQN will be set to 0 in the first message. For example, the FLOW bit and/or SEQN bit (before and after ARQN as shown in FIG. 5) may be set to 0. In some embodiments, the interfering packet may interfere with the access code of a Bluetooth packet (e.g., in the physical layer). In one example, the interfering packet may set the access code to random bits. In another example, the interfering packet may set each bit of the access code to the negation of the corresponding bit in an ACK packet. Audio source 102 may no longer synchronize (correlate) with the ACK packet (first message) from primary wireless headphone 104 and thus, cannot receive the ACK packet from primary wireless headphone 104. In some embodiments, the interfering packet may interfere with the header of a Bluetooth packet (e.g., as shown in FIG. 5). In one example, the interfering packet may set the header to random bits. In another example, the interfering packet may set each bit of the header to the negation of the corresponding bit in an ACK packet. Any bit error in the header of the first message caused by the interfering packet will result in the failure of error-checking (e.g., cyclic redundancy check (CRC)). Thus, audio source 102 cannot receive the ACK packet from primary wireless headphone 104. It is understood that the interfering packet is not limited to the examples above, and any suitable interfering packet may be used by secondary wireless headphone 106 to prevent audio source 102 from receiving a complete ACK packet when secondary wireless headphone 106 does not successfully receive the audio data packet.

FIG. 4B illustrates the partial-acknowledgement scheme. In timing 1, primary wireless headphone 104 transmits, in the time slot (N+1), a first message indicative of whether the audio data packet is successfully received in the time slot (N). The first message may be a first partial-acknowledgement (ACK_P1) packet in response to the successful reception of the audio data packet or a NACK packet in response to the unsuccessful reception of the audio data packet. In timing 1, secondary wireless headphone 106 transmits, in the time slot (N+1), a second partial-acknowledgement (ACK_P2) packet in response to the successful reception of the audio data packet in the time slot (N). As a result, when primary wireless headphone 104 successfully receives the audio data packet, ACK_P1 and ACK_P2 packets can form a complete ACK packet received by audio source 102; when primary wireless headphone 104 does not successfully receive the audio data packet, audio source 102 cannot receive a complete ACK packet. In one example, ACK_P1 packet may be the access code of a Bluetooth packet, and ACK_P2 packet may be a header of the Bluetooth packet. In another example, ACK_P2 packet may be the access code of a Bluetooth packet, and ACK_P1 packet may be a header of the Bluetooth packet. It is understood that ACK_P1 and ACK_P2 packets can be any portions of a complete ACK packet so long as they can together form a complete ACK packet.

In timing 2, primary wireless headphone 104 transmits, in the time slot (N+1), a first message indicative of whether the audio data packet is successfully received in the time slot (N). The first message may be a first partial-acknowledgement (ACK_P1) packet in response to the successful reception of the audio data packet or a NACK packet in response to the unsuccessful reception of the audio data packet. In timing 2, secondary wireless headphone 106 does not transmit, in time slot (N+1), any message in response to the unsuccessful reception of the audio data packet in the time slot (N). In other words, secondary wireless headphone 106 does not provide the ACK_P2 packet that is necessary to form a complete ACK packet. Thus, regardless of the first message (whether it is an ACK_P1 or NACK packet) from primary wireless headphone 104, no complete ACK packet can be received by audio source 102.

Figure 6:
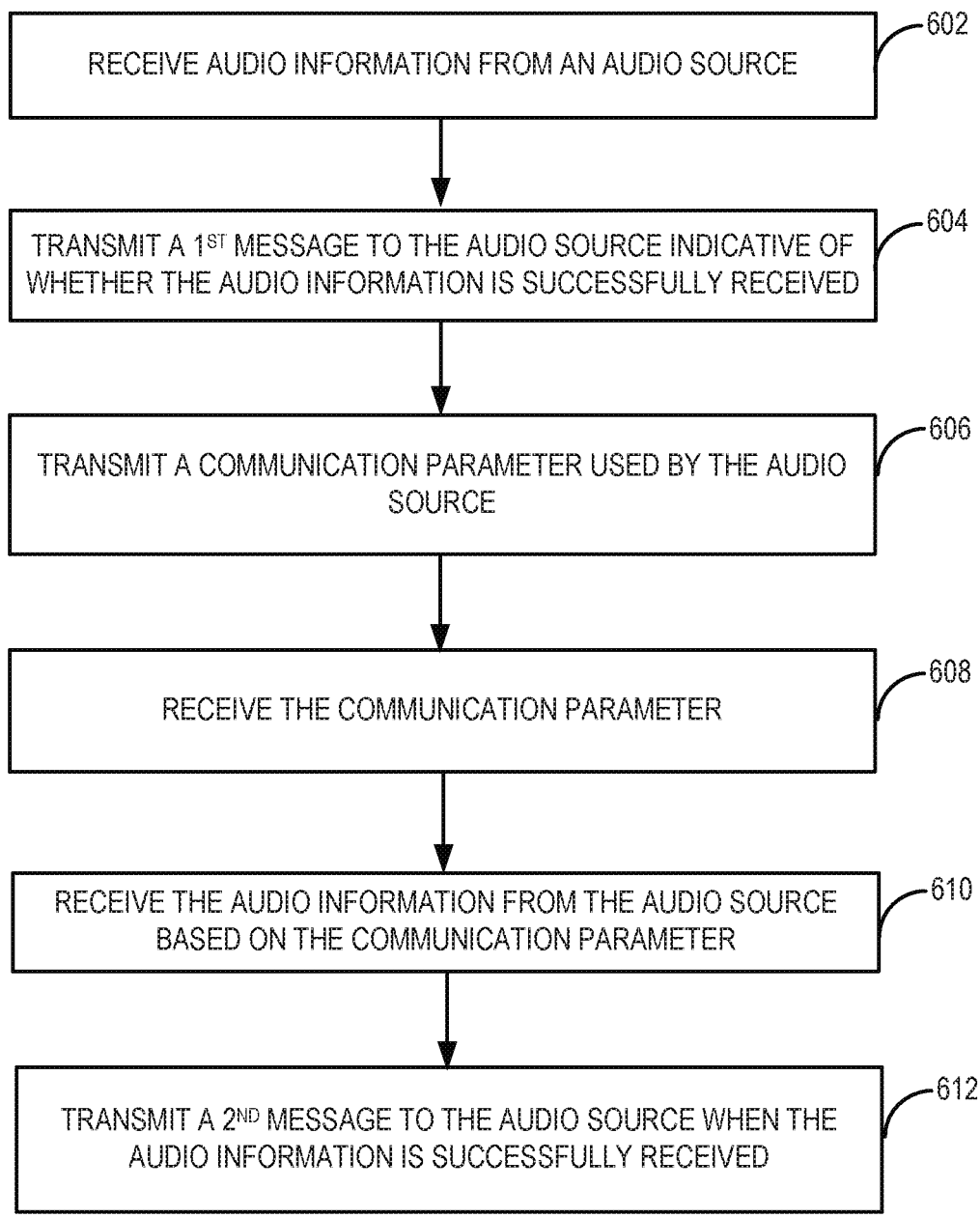
FIG. 6 is a flow chart illustrating an exemplary method for wirelessly communicating audio information in accordance with an embodiment.

FIG. 6 is a flow chart illustrating an exemplary method 600 for wirelessly communicating audio information in accordance with an embodiment. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than shown in FIG. 6, as will be understood by a person of ordinary skill in the art.

Method 600 shall be described with reference to FIGS. 1 and 2. However, method 600 is not limited to that exemplary embodiment. Method 600 may be performed according to the partial-acknowledgement scheme described above. Starting at 602, audio information is received from an audio source using a short-range communication protocol, such as the Bluetooth or WiFi protocol. The audio information may be received at a first frequency, such as 2.4 GHz. The audio information may be received in a first time slot. In some embodiments, high RF module 210 of primary wireless headphone 104 may receive a stream of mono or stereo audio information from RF module 204 of audio source 102 at a high RF, such as 2.4 GHz, using the Bluetooth protocol, in the time slot (N). At 604, a first message indicative of whether the audio information is successfully received is transmitted to the audio source. The first message may be determined based on the partial-acknowledgement scheme and include a first partial-acknowledgment (ACK_P1) packet when the audio information is successfully received and a negative acknowledgement (NACK) packet when the audio information is not successfully received. The first message may be transmitted at the first frequency as well. The first message may be transmitted in a second time slot subsequent to the first time slot. In some embodiments, depending on whether the audio information is successfully received or not, low RF module 212 of primary wireless headphone 104 may transmit the ACK_P1 packet or the NACK packet to RF module 204 of audio source 102 at a low RF, such as 10 MHz, in the time slot (N+1). At 606, a communication parameter associated with the short-range communication protocol used by the audio source is transmitted. The communication parameter may be transmitted at a second frequency lower than the first frequency, such as 10 MHz. In some embodiments, low RF module 212 of primary wireless headphone 104 may transmit the communication parameter to secondary wireless headphone 106.

At 608, the communication parameter is received. The communication parameter may be used to establish a snoop bidirectional communication link with the audio source. In some embodiments, low RF module 226 of secondary wireless headphone 106 may receive the communication parameter from primary wireless headphone 104. At 610, the audio information is received from the audio source based on the communication parameter using the short-range wireless communication protocol, such as the Bluetooth or WiFi protocol. The audio information transmitted from the audio source may be snooped via the snoop bidirectional communication link. In some embodiments, high RF module 224 of secondary wireless headphone 106 may receive (snoop) the stream of mono or stereo audio information from RF module 204 of audio source 102 at a high RF, such as 2.4 GHz, using the Bluetooth protocol, in the time slot (N). At 612, a second message is transmitted to the audio source when the audio information is successfully received (snooped). The first message and second message may determine whether to re-transmit the audio information. The second message may be determined based on the partial-acknowledgement scheme and include a second partial-acknowledgement (ACK_P2) packet that forms a complete acknowledgement (ACK) packet with the first partial-acknowledgement (ACK_P1) packet. In case that the audio information is not successfully received (snooped), no second message may be transmitted. In some embodiments, depending on whether the audio information is successfully received, low RF module 226 of secondary wireless headphone 106 may transmit the ACK_P2 packet to RF module 204 of audio source 102 at a low RF, such as 10 MHz, in the time slot (N+1).

Figure 7:
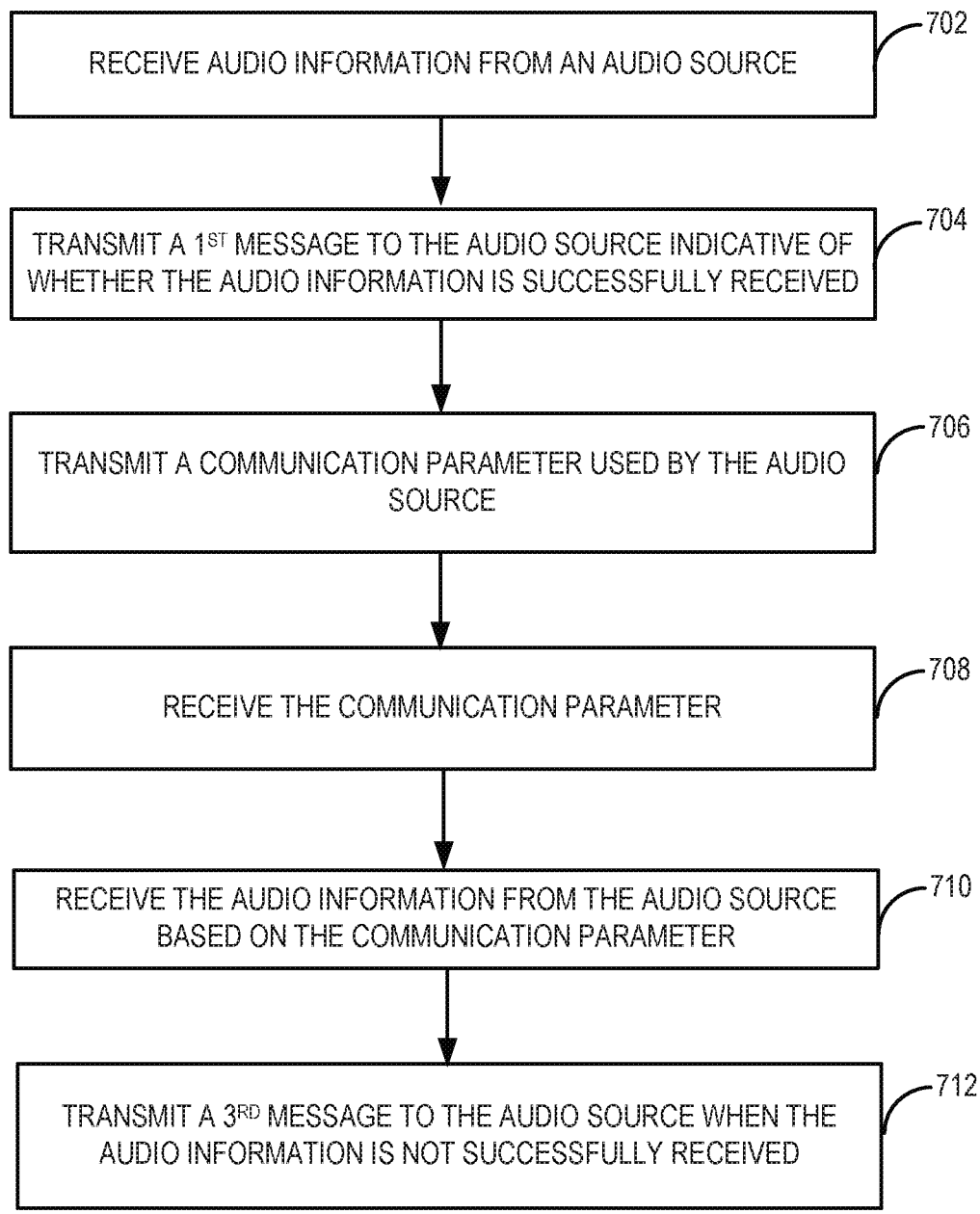
FIG. 7 is a flow chart illustrating another exemplary method for wirelessly communicating audio information in accordance with an embodiment.

FIG. 7 is a flow chart illustrating an exemplary method 700 for wirelessly communicating audio information in accordance with an embodiment. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than shown in FIG. 7, as will be understood by a person of ordinary skill in the art.

Method 700 shall be described with reference to FIGS. 1 and 2. However, method 700 is not limited to that exemplary embodiment. Method 700 may be performed according to the interference scheme described above. Starting at 702, audio information is received from an audio source using a short-range communication protocol, such as the Bluetooth or WiFi protocol. The audio information may be received at a first frequency, such as 2.4 GHz. The audio information may be received in a first time slot. In some embodiments, high RF module 210 of primary wireless headphone 104 may receive a stream of mono or stereo audio information from RF module 204 of audio source 102 at a high RF, such as 2.4 GHz, using the Bluetooth protocol, in the time slot (N). At 704, a first message indicative of whether the audio information is successfully received is transmitted to the audio source. The first message may be determined based on the interference scheme and include an acknowledgment (ACK) packet when the audio information is successfully received and a negative acknowledgement (NACK) packet when the audio information is not successfully received. The first message may be transmitted at the first frequency as well. The first message may be transmitted in a second time slot subsequent to the first time slot. In some embodiments, depending on whether the audio information is successfully received or not, low RF module 212 of primary wireless headphone 104 may transmit the ACK packet or the NACK packet to RF module 204 of audio source 102 at a low RF, such as 10 MHz, in the time slot (N+1). At 706, a communication parameter associated with the short-range communication protocol used by the audio source is transmitted. The communication parameter may be transmitted at a second frequency lower than the first frequency, such as 10 MHz. In some embodiments, low RF module 212 of primary wireless headphone 104 may transmit the communication parameter to secondary wireless headphone 106.

At 708, the communication parameter is received. The communication parameter may be used to establish a snoop bidirectional communication link with the audio source. In some embodiments, low RF module 226 of secondary wireless headphone 106 may receive the communication parameter from primary wireless headphone 104. At 710, the audio information is received from the audio source based on the communication parameter using the short-range wireless communication protocol, such as the Bluetooth or WiFi protocol. The audio information transmitted from the audio source may be snooped via the snoop bidirectional communication link. In some embodiments, high RF module 224 of secondary wireless headphone 106 may receive (snoop) the stream of mono or stereo audio information from RF module 204 of audio source 102 at a high RF, such as 2.4 GHz, using the Bluetooth protocol, in the time slot (N). At 712, a third message is transmitted to the audio source when the audio information is not successfully received (snooped). The first message and third message may determine whether to re-transmit the audio information. The third message may be determined based on the interference scheme and include an interfering packet that interferes with the reception of the first message at the audio source. In case that the audio information is successfully received (snooped), no third message may be transmitted. In some embodiments, depending on whether the audio information is successfully received, low RF module 226 of secondary wireless headphone 106 may transmit the interfering packet to RF module 204 of audio source 102 at a low RF, such as 10 MHz, in the time slot (N+1).

Figure 8:
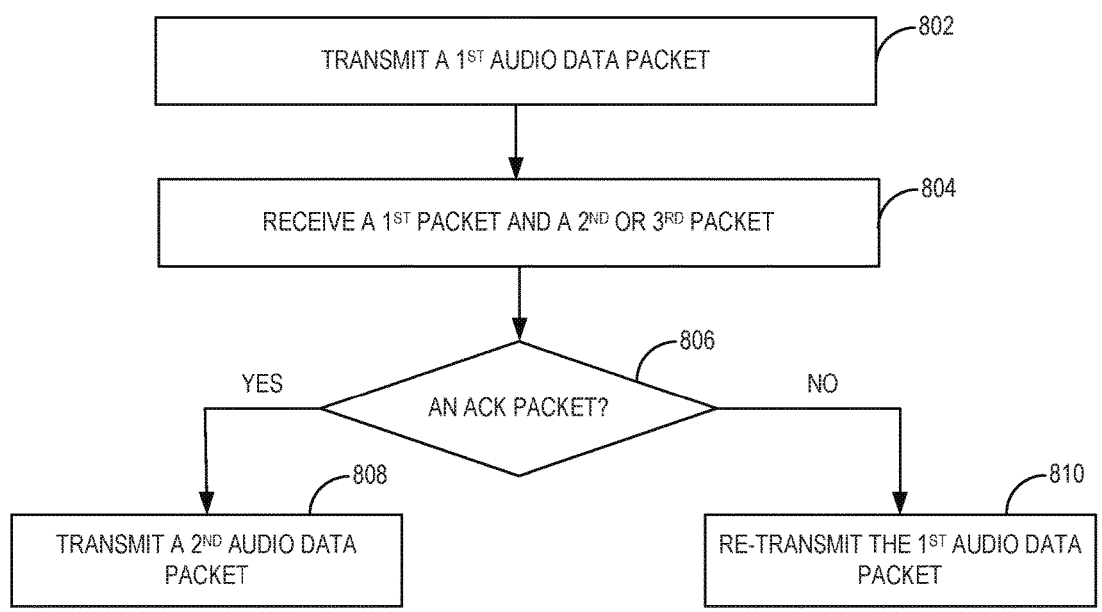
FIG. 8 is a flow chart illustrating still another exemplary method for wirelessly communicating audio information in accordance with an embodiment.

FIG. 8 is a flow chart illustrating an exemplary method 800 for wirelessly communicating audio information in accordance with an embodiment. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than shown in FIG. 8, as will be understood by a person of ordinary skill in the art.

Method 800 shall be described with reference to FIGS. 1 and 2. However, method 800 is not limited to that exemplary embodiment. Starting at 802, a first audio data packet is transmitted in a first time slot, for example, using a short-range communication protocol, such as the Bluetooth or WiFi protocol. In some embodiments, RF module 204 of audio source 102 may transmit the first audio data packet in the time slot (N) using the Bluetooth protocol.

At 804, one or more packets are received in a second time slot subsequent to the first time slot. A first packet may be always received from the primary wireless headphone, for example, either as a complete acknowledgement (ACK) packet, a partial-acknowledgment (ACK_P) packet, or a negative acknowledgment (NACK) packet. From the secondary wireless headphone, (1) a second packet, such as a partial-acknowledgment (ACK_P) packet, may be received, such that a complete ACK packet may be formed with the ACK_P packet from the primary wireless headphone; (2) a third packet, such as an interfering packet, may be received, such that any first packet from the primary wireless headphone is interfered by the interfering packet, and no complete ACK packet can be received; or (3) no packet may be received at all. In some embodiments, RF module 204 of audio source 102 may receive the one or more packets in the time slot (N+1).

At 806, whether a complete ACK packet is received is determined based on the one or more packets received at 804. In one example, a complete ACK packet is received when the first packet is an ACK packet and is not interfered by an interfering packet. In another example, a complete ACK packet is received when the first packet is an ACK_P packet and the second packet is received as another ACK-P packet. If the complete ACK packet is received at 806, method 800 proceeds to 808 in which a second audio data packet is transmitted in the second time slot. Otherwise, no complete ACK packet is received. In one example, no complete ACK packet is received when the first packet is a NACK packet. In another example, no complete ACK packet is received when the third packet is received as an interfering packet. In still another example, no complete ACK packet is received when only one ACK_P packet is received. If the complete ACK packet is not received at 806, method 800 proceeds to 810 in which the first audio data packet is re-transmitted in the second time slot.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure or the appended claims in any way.

While the present disclosure has been described herein with reference to exemplary embodiments for exemplary fields and applications, it should be understood that the present disclosure is not limited thereto. Other embodiments and modifications thereto are possible, and are within the scope and spirit of the present disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

The breadth and scope of the present disclosure should not be limited by any of the above-described exemplary embodiments, but should be defined only in accordance with the following claims and their equivalents.

What is claimed is:

1. A wireless audio system, comprising:
a primary wireless headphone configured to:
receive, from an audio source, audio information using a short-range wireless communication protocol;
transmit, to the audio source, a first message indicative of whether the audio information is successfully received by the primary wireless headphone; and
transmit a communication parameter associated with the short-range wireless communication protocol used between the audio source and the primary wireless headphone; and
a secondary wireless headphone configured to:
receive, from the primary wireless headphone, the communication parameter;
snoop, from the audio source, the audio information based on the communication parameter using the short-range wireless communication protocol; and
transmit, to the audio source, a second message when the audio information is successfully received by the secondary wireless headphone,
wherein the first message and second message determine whether to re-transmit the audio information, and
the primary wireless headphone does not receive the second message from the secondary wireless headphone.

2. The wireless audio system of claim 1, wherein:
the first message comprises a first partial-acknowledgment packet when the audio information is successfully received by the primary wireless headphone and a negative acknowledgement (NACK) packet when the audio information is not successfully received by the primary wireless headphone; and
the second message comprises a second partial-acknowledgement packet that forms an acknowledgement (ACK) packet with the first partial-acknowledgement packet.

3. The wireless audio system of claim 2, wherein:
the short-range wireless communication protocol comprises a Bluetooth protocol; and
the first and second partial-acknowledgment packets comprise an access code and a header of a Bluetooth packet.

4. The wireless audio system of claim 1, wherein:
a local clock of the primary wireless headphone is synchronized with the audio source; and
a local clock of the secondary wireless headphone is synchronized with the audio source, so that the local clock of the primary wireless headphone is synchronized with the local clock of the secondary wireless headphone.

5. The wireless audio system of claim 1, wherein the secondary wireless headphone is configured to establish a bidirectional communication link with the audio source based on the communication parameter.

6. The wireless audio system of claim 1, wherein each of the primary and secondary wireless headphones is configured to receive the audio information in a first time slot and transmit the corresponding first or second message to the audio source in a second time slot subsequent to the first time slot.

7. A wireless audio system, comprising:
a primary wireless headphone configured to:
receive, from an audio source, audio information using a short-range wireless communication protocol;
transmit, to the audio source, a first message indicative of whether the audio information is successfully received by the primary wireless headphone; and
transmit a communication parameter associated with the short-range wireless communication protocol used between the audio source and the primary wireless headphone; and
a secondary wireless headphone configured to:
receive, from the primary wireless headphone, the communication parameter;
snoop, from the audio source, the audio information based on the communication parameter using the short-range wireless communication protocol; and
transmit, to the audio source, a second message when the audio information is not successfully received by the secondary wireless headphone, wherein the first message and second message determine whether to re-transmit the audio information, and
the primary wireless headphone does not receive the second message from the secondary wireless headphone.

8. The wireless audio system of claim 7, wherein:
the first message comprises an acknowledgment (ACK) packet when the audio information is successfully received by the primary wireless headphone and a negative acknowledgement (NACK) packet when the audio information is not successfully received by the primary wireless headphone; and
the second message comprises an interfering packet that interferes with the reception of the first message at the audio source.

9. The wireless audio system of claim 8, wherein:
the short-range wireless communication protocol comprises a Bluetooth protocol; and
the interfering packet interferes with at least one of an acknowledge indication bit (ARQN), an access code, and a header of a Bluetooth packet.

10. The wireless audio system of claim 7, wherein signal quality of the secondary wireless headphone is better than signal quality of the primary wireless headphone.

11. The wireless audio system of claim 7, wherein the secondary wireless headphone is configured to establish a bidirectional communication link with the audio source based on the communication parameter.

12. The wireless audio system of claim 7, wherein each of the primary and secondary wireless headphones is configured to receive the audio information in a first time slot and transmit the corresponding first or second message to the audio source in a second time slot subsequent to the first time slot.

13. A method for wirelessly communicating audio information, comprising:
receiving, by a primary wireless headphone, audio information from an audio source using a short-range wireless communication protocol;
transmitting, by the primary wireless headphone, a first message to the audio source indicative of whether the audio information is successfully received by the primary wireless headphone;
transmitting, by the primary wireless headphone, a communication parameter associated with the short-range wireless communication protocol used between the audio source and the primary wireless headphone;
receiving, by a secondary wireless headphone, the communication parameter from the primary wireless headphone;
snooping, by the secondary wireless headphone, the audio information from the audio source based on the communication parameter using the short-range wireless communication protocol; and
transmitting, by the secondary wireless headphone, a second message to the audio source when the audio information is successfully received by the secondary wireless headphone or a third message to the audio source when the audio information is not successfully received by the secondary wireless headphone,
wherein the first message and second message or the first message and third message determine whether to re-transmit the audio information, and
the primary wireless headphone does not receive the second message from the secondary wireless headphone.

14. The method of claim 13, wherein:
the first message comprises a first partial-acknowledgment packet when the audio information is successfully received by the primary wireless headphone and a negative acknowledgement (NACK) packet when the audio information is not successfully received by the primary wireless headphone; and
the second message comprises a second partial-acknowledgement packet that forms an acknowledgement (ACK) packet with the first partial-acknowledgement packet.

15. The method of claim 13, wherein:
the first message comprises an ACK packet when the audio information is successfully received by the primary wireless headphone and an NACK packet when the audio information is not successfully received by the primary wireless headphone; and
the third message comprises an interfering packet that interferes with the reception of the first message at the audio source.

16. A wireless audio system, comprising:
a primary wireless headphone configured to:
receive, from an audio source, audio information using BLUETOOTH protocol at a first frequency; and
transmit a communication parameter using an amended BLUETOOTH protocol at a second frequency lower than the first frequency, the communication parameter associated with the BLUETOOTH protocol used between the audio source and the primary wireless headphone; and
a secondary wireless headphone configured to:
receive, from the primary wireless headphone, the communication parameter,
receive, from the audio source, the audio information based on the communication parameter using the BLUETOOTH protocol at the first frequency; and
transmit, to the primary wireless headphone, a first message when the audio information is successfully received by the secondary wireless headphone or when the audio information is not successfully received by the secondary wireless headphone using the amended BLUETOOTH protocol at the second frequency,
wherein the primary wireless headphone is further configured to transmit, to the audio source, a second message indicative of whether both the primary wireless headphone and the secondary wireless headphone successfully receive the audio information based on the first message using the BLUETOOTH protocol at the first frequency.

17. The wireless audio system of claim 16, wherein:
the audio information comprises first voice information; and
at least one of the primary and secondary wireless headphones is further configured to transmit, to the audio source, second voice information using the BLUETOOTH protocol at the first frequency.

* * * * *